United States Patent [19]

Carignan

[11] Patent Number: 5,339,699
[45] Date of Patent: Aug. 23, 1994

[54] DISPLACEMENT/FORCE TRANSDUCERS UTILIZING HALL EFFECT SENSORS

[75] Inventor: Forest J. Carignan, Bedford, Mass.

[73] Assignee: Advanced Mechanical Technology, Inc., Watertown, Mass.

[21] Appl. No.: 844,126

[22] Filed: Mar. 2, 1992

[51] Int. Cl.$^5$ .............................................. G01L 1/12
[52] U.S. Cl. ........................... 73/862.69; 73/862.633
[58] Field of Search .................... 73/862.633, 862.634, 73/862.632, 779, 774, 862.621, 862.639, 862.637, 862.638, 862.69; 33/787, 788; 324/207.2

[56] References Cited

U.S. PATENT DOCUMENTS

| | | | |
|---|---|---|---|
| 2,859,613 | 11/1958 | Green | 73/862.638 |
| 3,060,370 | 10/1962 | Varterasian | 324/207.2 X |
| 3,288,541 | 11/1966 | Tracy | 308/2 |
| 3,384,424 | 5/1968 | Raines | 308/2 |
| 4,083,236 | 4/1978 | Steinmeuller | 73/862.638 |
| 4,340,877 | 7/1982 | Herden | 338/42 |
| 4,484,173 | 11/1984 | Everett | 338/42 |
| 5,045,827 | 9/1991 | Haggstrom | 338/2 |

FOREIGN PATENT DOCUMENTS

1052708 12/1959 Fed. Rep. of Germany .

Primary Examiner—Hezron E. Williams
Assistant Examiner—Mort Smith
Attorney, Agent, or Firm—Hamilton, Brook, Smith & Reynolds

[57] ABSTRACT

A device for measuring displacement and force comprises two masses of material linked together by a parallel beam linkage which permits displacement of one mass relative to the other in a single direction. The displacement or force input to be measured is applied to one of the masses in the allowable direction. The displacement of the masses with respect to each other is sensed by a sensor. In a preferred embodiment, the sensor comprises a Hall effect sensor attached to one of the masses positioned between two magnets attached to the other mass. Movement of one mass relative to the other changes the magnetic field around the Hall effect sensor. The change is sensed by the Hall effect sensor.

26 Claims, 7 Drawing Sheets

$$Z = \frac{FL^3}{EBT^3}$$

F = Force
Z = displacement
L = beam length
E = Young's Modulus
B = beam width (x direction)
g = slot thickness
T = beam thickness

DISPLACEMENT/FORCE TRANSDUCERS UTILIZING HALL EFFECT SENSORS

BACKGROUND OF THE INVENTION

In many environments, accurate and precise measurements are required of small positional displacements of objects within mechanical systems. It is also often required to obtain measurements of force applied in a particular direction.

Most mechanical devices designed to obtain these measurements are typically limited by the inherent characteristics of mechanical systems. These limitations include hysteresis and backlash. Also, forces and displacements are rarely limited in application to only a single direction. A force or displacement applied in primarily the z direction, for example, will alamo have components in both the x and y directions. In addition, x, y, and z torsional components will also be present. If it is desired to obtain an accurate measurement of the displacement or force in the z direction only, the effect of these additional components must be minimized in the measurement device.

SUMMARY OF THE INVENTION

The present invention provides a device for measuring displacement. The device comprises two masses of material linked together via two parallel beams. The beams are configured so as to allow the two masses to move with respect to each other in a direction transverse to the beams against a return force provided by the beams. Motion in other directions between the masses is virtually eliminated by the parallel beam configuration. A sensor is used to sense the displacement of the masses relative to each other.

One mass may be located within the other mass. In this configuration, the masses and the parallel beams linking them may form a single unit formed from a single piece of material.

The beams may each consist of a piece of material wrapped around itself to form the beam into a spring member. This may be accomplished by cutting the masses and the fold-back spring beams from a single piece of material.

The device may also be used as a force transducer. With the spring characteristics of the linkage known, the displacement measurement provides an indication of the force applied to one of the masses. Thus, various ranges of force can be measured by using different spring members in the linkage.

The device may also be used as an inclination transducer. With the masses being of known mass and the beams having a known spring constant, the displacement measurement provides an indication of the angle of inclination of the device.

In the preferred embodiment of the invention, the sensor comprises a Hall effect sensor positioned between two magnets. The Hall effect sensor is fixed to the first mass. The two magnets are fixed to the second mass with one magnet on either side of the Hall effect sensor. Thus, the Hall effect sensor is positioned in the magnetic field within the gap between the two magnets. When the second mass is displaced with respect to the first mass, the Hall effect sensor detects the resulting change in the magnetic field and outputs a signal indicative of the amount of displacement.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
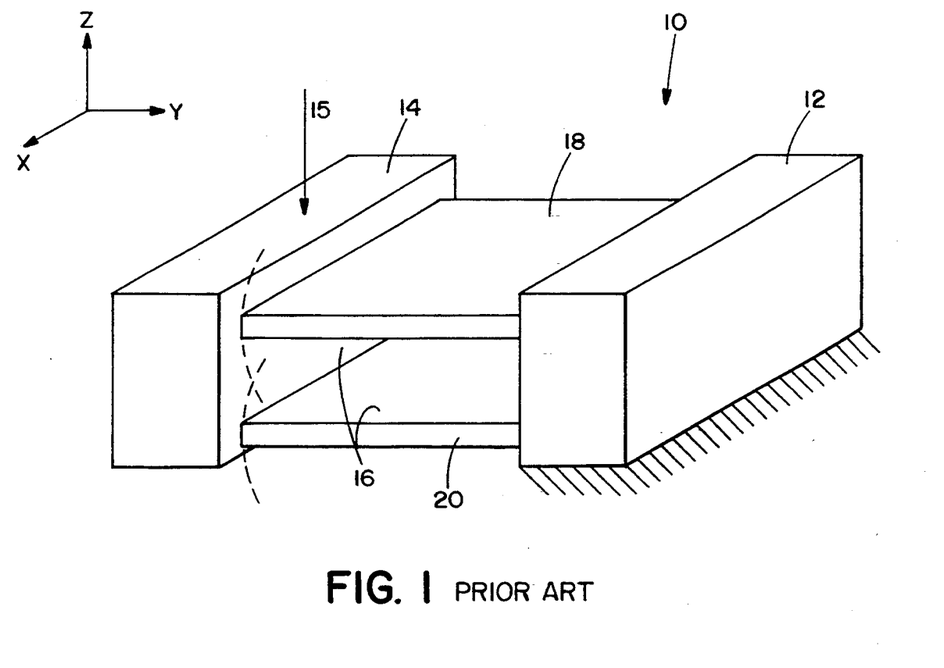
FIG. 1 schematically depicts a prior art configuration of two masses and parallel beams.

FIG. 1 schematically depicts a prior art configuration of two masses 12 and 14 side-by-side linked by parallel beams 18 and 20. Mass 12 is linked to mass 14 via parallel beam linkage 16. Mass 12 is considered stationary, and mass 14 is movable. Linkage 16 is comprised of two parallel beams 18 and 20. The beams 18, 20 are fixed at their ends to masses 12, 14. They allow mass 14 to move in the ±z direction in response to a force or displacement input 15 while remaining rigid to movement of mass 14 in any other direction. The beams 18, 20 also provide a reactive force against the force or displacement input 15 such that when the input 15 is removed, mass 14 returns to its original position. The linkage 16 thus allows lateral movement of mass 14 relative to mass 12 while minimizing movement in other directions.

A force or displacement input 15 applied in the z axis to mass 14 causes mass 14 to move in the z axis. Beams 18 and 20 are configured to provide a spring force against that movement. Also, they are rigid to any movement in the other axes. Therefore, they allow motion of mass 14 in only one direction while eliminating most motion in other directions.

One form of motion not eliminated by the configuration of FIG. 1 is motion of the masses 12, 14 toward each other when the input 15 is applied. When mass 14 is forced down, each of beams 18 and 20 bends into a slight "S" shape. This causes the ends of the beams 18 and 20 attached to mass 14 to translate along an arc as indicated by the dotted arcs in FIG. 1 (shown exaggerated for clarity). Since the ends of the beams 18, 20 arc, so will the mass 14 to which they are fixed. Due to this arc motion, there will be some displacement of mass 14 with respect to mass 12 in the y direction.

Figure 2:
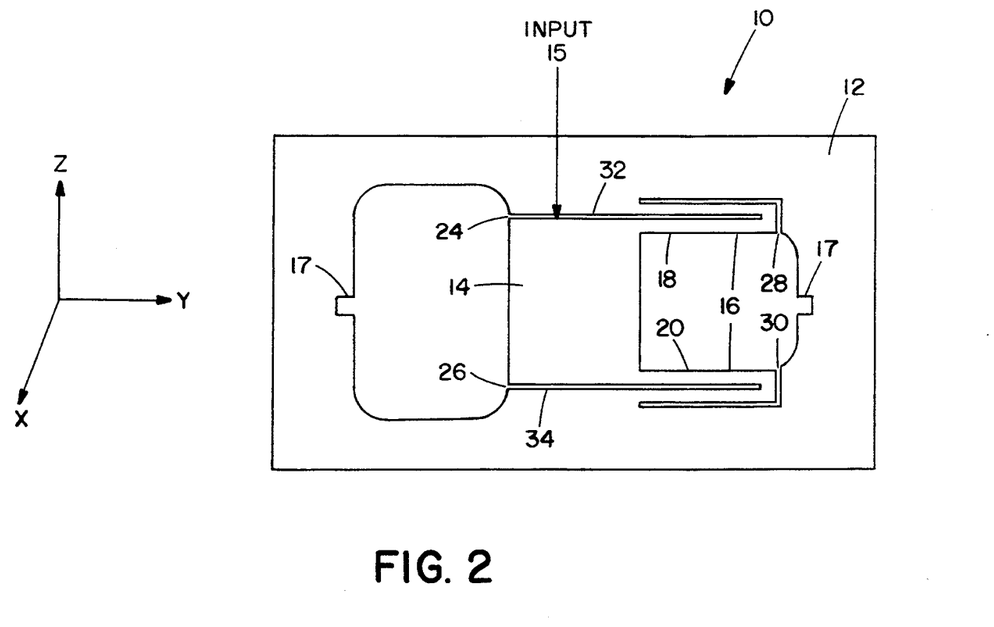
FIG. 2 shows the masses and the parallel beam linkage cut from a single piece of material in the preferred embodiment.

FIG. 2 shows in cross section the masses 12 and 14 and the linkage 16 in the preferred embodiment of the invention. The body of the transducer 10 serves as stationary mass 12 from FIG. 1. In one specific embodiment, the body is a rectangular block 1.25 inches high, 2.37 inches wide and one inch deep. In the preferred embodiment, the movable mass 14 is located within mass 12. The linkage 16 is comprised of beams 18 and 20. The beams 18, 20 are produced in a "foldback" spring configuration, the details of which will be discussed below. Both masses 12 and 14 and the linkage 16 are cut from a single piece of material using wire electrical-discharge macLining (EDM) techniques. Slots 24 and 26 define mass 12 and mass 14 and make up part of linkage 16. Slots 28 and 30 complete the linkage 16. Slots 24 and 28 form beam 18, and slots 26 and 30 form beam 20. Displacement or force input 15 is applied to mass 14 via an opening in mass 12, not shown.

Figure 3:
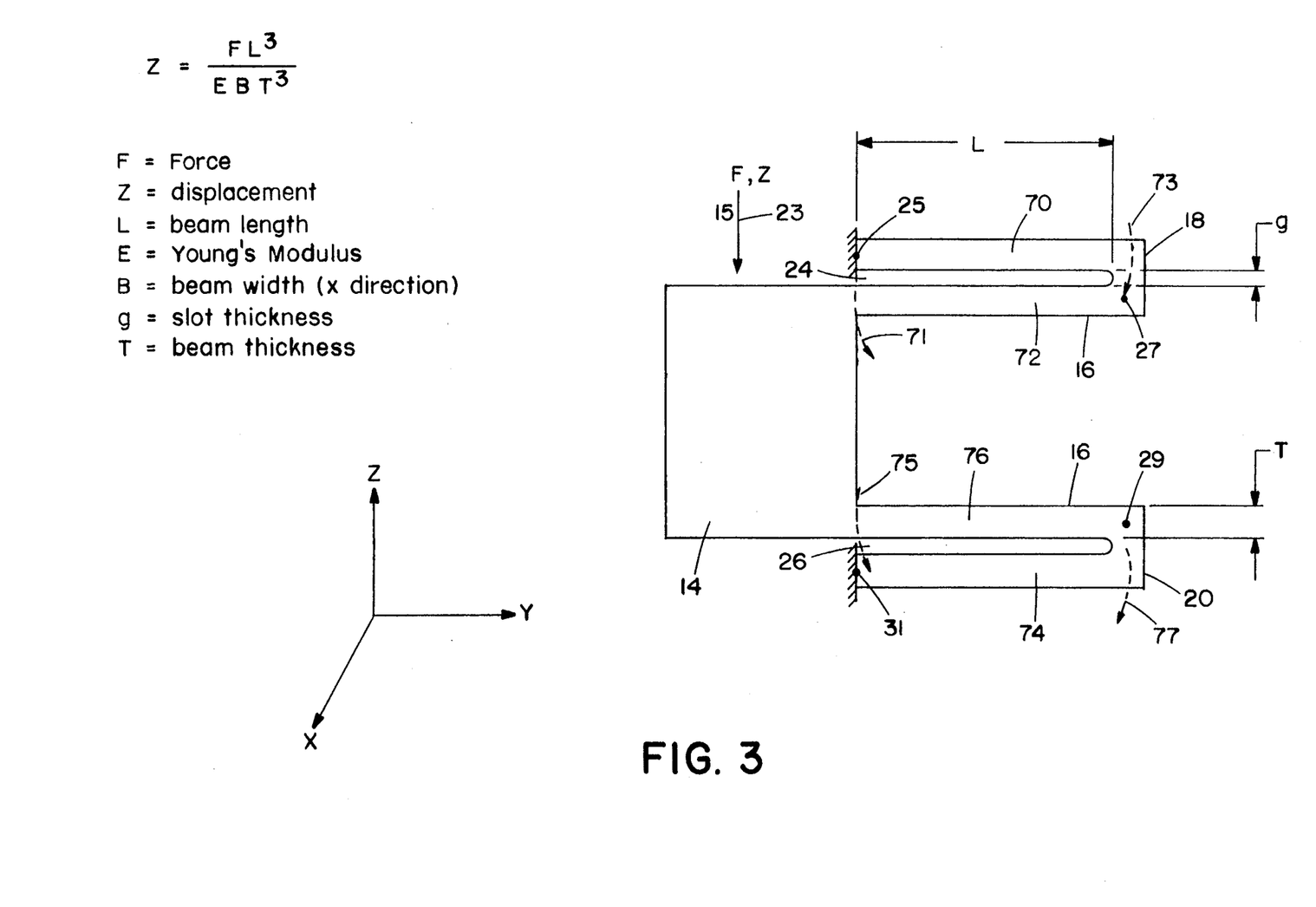
FIG. 3 depicts the details of the fold-back feature of the parallel beams and the parameters used in the displacement equation for the device.

The parallel beam linkage 16-between the masses is detailed in FIG. 3. In this embodiment, each beam is comprised of two arms in a fold-back configuration. As an example, beam 18 is comprised of arms 70 and 72 displaced relative to each other transverse to the beam structure itself. The arms 70 and 72 are joined end-to-end. The fold-back design of the beams 18, 20 effected by slots 24, 26, 28, and 30, provides the preferred embodiment with unique advantages. The fold-back of the beams 18, 20 minimizes displacement of mass 14 in the y axis. To illustrate, if a displacement or force input 15 is applied in the direction indicated by arrow 23 in FIG. 3, mass 14 will move in that direction. Beam 18 will expand as arms 70 and 72 move away from each other. At the same time, beam 20 will compress as arms 74 and 76 move toward each other.

The motion of the individual arms within a beam operates to eliminate motion of mass 14 in the y direction. As the input 15 forces mass 14 down, arm 70 bends in the slight "S" shape discussed above with reference to FIG. 1. The end of arm 70 arcs as indicated by dotted arrow 73. This arc tends to translate the end of the arm 70 to the left. However, at the same time, arm 72 also bends into the S shape, and the end of arm 72 arcs as indicated by dotted arrow 71. This motion tends to translate the end of arm 72 to the right. These two approximately equal and opposite motions tend to cancel each other out. Thus, the top of the mass 14 moves only in the z direction. The bottom of the mass 14 is prevented from moving in the y direction in the same manner by beam 20. Arm 76 arcs as indicated by dotted arrow 75, tending to move mass 14 to the right. Arm 74 arcs as indicated by dotted arrow 77, tending to move mass 14 to the left, thus cancelling out the motion to the right. Thus, beams 18 and 20 configured as fold-back springs act in concert to eliminate motion of mass 14 in the y direction.

The unitary mass and beam design provides the transducer 10 with additional features. The transducer 10 may be made compact because the fold-back design provides for more desired spring length in a small space. Also, because the masses 12, 14 and the beams 18, 20 are made from one piece of material, hysteresis-free motion can be achieved. As noted above, there is essentially no side motion between the masses 12, 14. Also, the motion is directly and linearly proportional to force along the z axis.

Slots 24, 26, 28, 30 of the unitary design also provide extremely high force overload protection for the transducer. A force or displacement input 15 beyond the displacement range of the transducer simply causes mass 14 to bump against surface 32 or 34 when slot 24 or 26, respectively, closes. Thus, the single piece configuration of the preferred embodiment provides displacement stops to prevent overload of the transducer 10.

Also, due to the one-piece design of the invention, very high tension or compression loads applied to mass 14 will not damage the transducer 10. The side load ($F_x$, $F_y$) capacity and the three torsional ($M_x$, $M_y$, $M_z$) capacities are substantial and depend upon the load range of the transducer 10. The load range can be varied by changing the characteristics of the parallel beams 18, 20 as discussed below.

Figure 4:
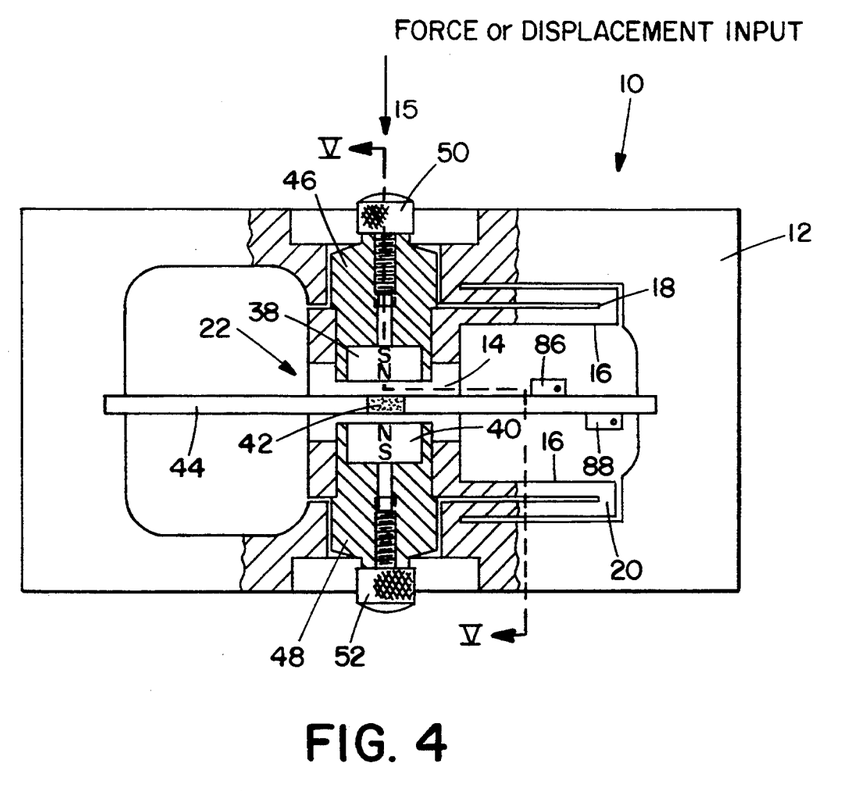
FIG. 4 shows the preferred embodiment of the invention.

FIG. 4 shows the preferred embodiment displacement and force transducer 10. Displacement sensor 22 comprises two magnets 38 and 40 on opposite sides of a Hall effect sensor 42. The Hall effect sensor 42 is mounted on a printed circuit board 44 which is mounted on the transducer body 12 in grooves 17 (see FIG. 2). Magnet holders 46 and 48 are press fit into mass 14. Magnets 38 and 40 are mounted on magnet holders 46 and 48, respectively, with like poles facing each other and Hall effect sensor 42 is positioned at the midpoint of the gap between the magnets 38, 40. The magnetic arrangement produces a magnetic field which is zero in the center of the gap between the magnets 38, 40 and which varies linearly in the direction perpendicular to the faces of the magnets 38, 40. The change in field for motion parallel to the gap is small for gaps less than one-half the magnet diameter and motions of less than one-half the gap spacing.

Displacement or force input 15 at contact point 50 or 52 is transmitted to mass 14 through magnet holders 46 or 48. Displacement of magnets 38, 40 causes a change in the magnetic field in the gap between the magnets 38, 40. The Hall effect sensor 42 senses the change in magnetic field and generates a signal indicative of the change. This signal is transmitted to the circuitry on the printed circuit board 44. The circuitry conditions the signal and provides a bipolar output signal which is indicative of the displacement of mass 14.

Figure 5:
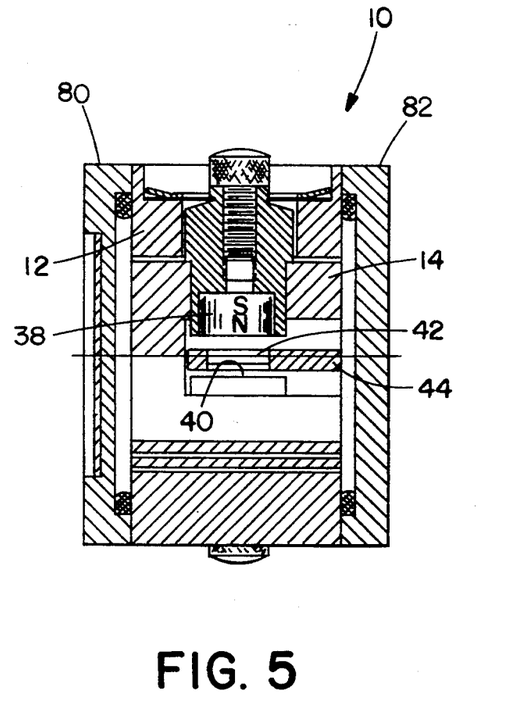
FIG. 5 is a sectional view of the preferred embodiment taken along line V—V of FIG. 4.

FIG. 5 is a sectional view of the transducer 10 taken along line V—V as shown in FIG. 4. Covers 80 and 82 enclose the assembly. This view shows the Hall effect sensor 42 on the circuit board 44 mounted between the magnets 38 and 40. It can be seen that displacement of mass 14 will displace the magnets 38 and 40. This will cause a change in the magnetic field around the board 44 which will be sensed by the Hall effect sensor 42.

Figure 6:
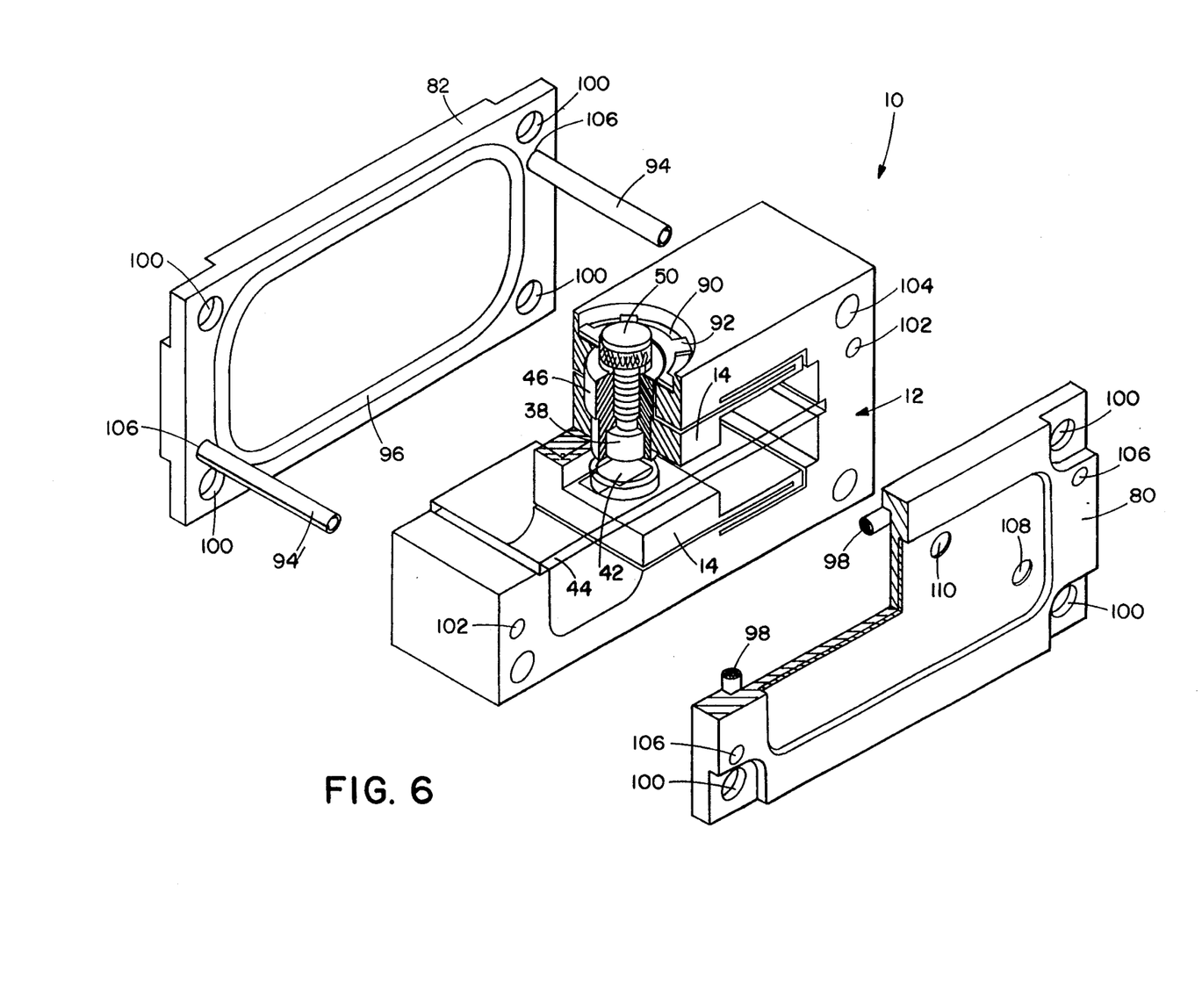
FIG. 6 is an isometric view of the preferred embodiment.

FIG. 6 is an isometric view of the preferred embodiment of the transducer 10. The covers 80 and 82 have been removed. Contact point 50 is shown threaded into magnet holder 46. This contact point 50 can be removed and exchanged for different types of contact points 50. Seal 90 seals the transducer from environmental contaminants. Seal retainer 92 holds the seal 90 in place. Magnet 38 is shown attached to magnet holder 46 and is located directly above the Hall effect sensor 42 on the circuit board 44.

When attached, covers 80 and 82 seal the transducer 10. Cover 82 attaches to the transducer via alignment pins 94 pressed into alignment holes 106 (not shown). Alignment pins 94 pass through clearance holes 102 in the body. The pins 94 are pressed into holes 106 in cover 80 to enclose the transducer 10. Seal 96 on cover 82 and seal 98 on cover 80 contact the transducer body to seal out environmental contaminants. When the transducer 10 is assembled, clearance holes 100 in the covers 80, 82 and 104 in the body provide clearance for hardware to mount the transducer 10 (not shown). Access holes 108 and 110 provide access to screwdriver-adjustable potentiometers 88 and 86 on the circuit board 44, respectively (see FIG. 4).

Figure 7:
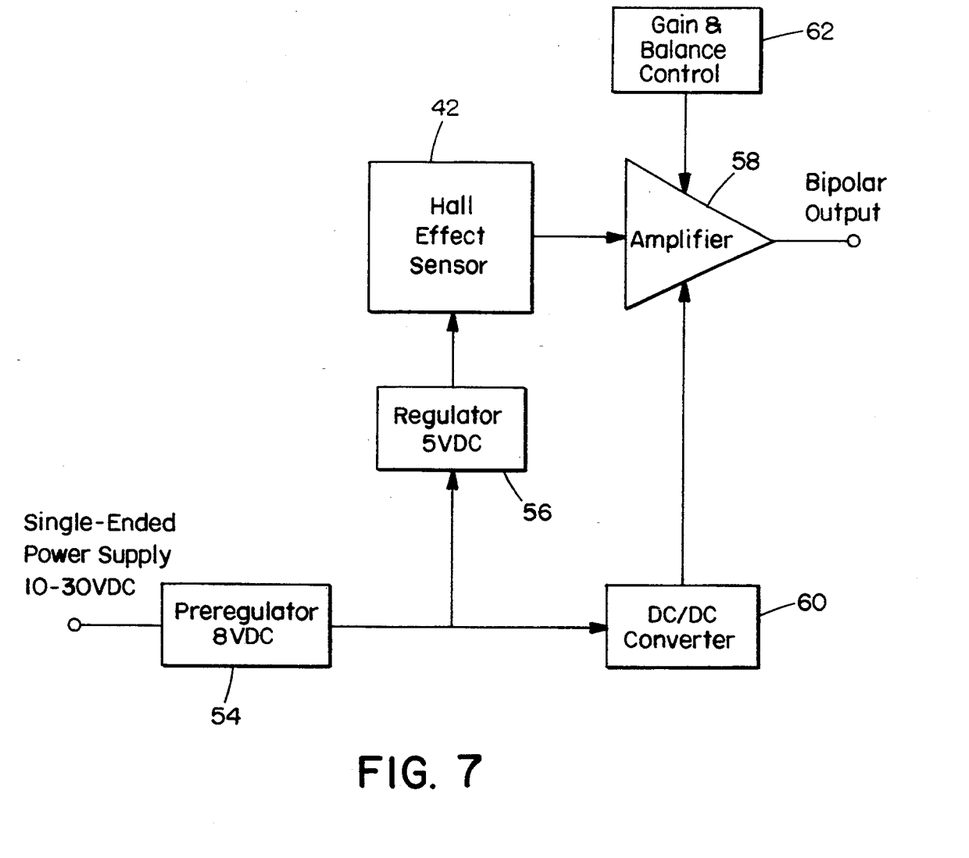
FIG. 7 is a block diagram of the electronics of the preferred embodiment.

FIG. 7 is a block diagram of the electronic circuitry on printed circuit board 44. A single-ended DC power supply (not shown) provides a DC voltage between +10 and +30 volts to a +8 VDC preregulator 54. The +8 VDC output of preregulator 54 is provided to +5 VDC regulator 56. The output of regulator 56 powers the Hall effect sensor 42. The sensor 42 provides an output to amplifier 58 based upon the intensity of the magnetic field surrounding the sensor 42. In the preferred embodiment, a ±0.010 inch displacement of mass 14 will cause an approximate ±200 Gauss deviation in magnetic field around the sensor 42. This corresponds to a ±0.3 volt change in sensor 42 output. DC/DC converter 60 converts the +8 VDC from the preregulator 54 to ±15 VDC to power the amplifier 58. The ±0.3 volt output from the Hall effect sensor 42 is amplified to a ±10.0 volt output from the electronic circuitry.

Gain and balance control 62 allows the user to adjust the output of the transducer 10 via screwdriver-adjustable potentiometers 86 and 88 (see FIG. 4) accessible through holes in the transducer cover 80. The gain of amplifier 58 may be adjusted via potentiometer 86 so that the range of the output may be varied. For example, the user may require the output to swing between ±5 volts instead of ±10 volts. The other control accessible to the user is the zero balance of the unit. Ordinarily, a zero displacement will yield a zero output, and the voltage output will vary symmetrically on either side of zero volts as the displacement varies on either side of zero inches. However, in some applications it may be desirable to set the zero balance such that zero displacement yields a non-zero voltage output. This may occur where more displacement is expected in one direction than in the other. This setting may be accomplished by the user via adjustable potentiometer 88.

The displacement and force transducer 10 of the present invention can be used for many different load ranges. The maximum displacement of the transducer 10 is set at +0.010 linch with +0.006 inch of overtravel. The force requires to produce this full scale displacement can be varied between about 10 grams and about 20 pounds. The full scale force for the transducer 10 is determined by the spring characteristics of the linkage 16. This can be seen by referring back to FIG. 3 which shows the details of the linkage 16. By substituting the required displacement of 0.010 inch for Z and the desired full-scale load range for F in the equation, one can solve for the required beam parameters. Thus, the desired load range for the transducer 10 determines the dimensions of the components of the beams 18, 20.

When a very low load range is selected, the transducer 10 can be used as an inclinometer. In this configuration, take contact points 50, 52 are removed, and the access holes to the mass 14=are capped off. In the inclinometer mode, the weight of mass 14 provides sufficient force to displace itself against the spring members 18, 20 of linkage 16. The closer the displacement axis is to vertical, the greater the displacement. Thus, the amount of displacement of mass 14 provides an indication of the angle of inclination of the transducer 10. The angle of inclination θ of the axis of displacement from vertical may be calculated by $$\theta = \cos^{-1}\left[\frac{mg}{kx}\right];$$

where
m = mass of mass 14,
g = acceleration due to gravity,
k = spring constant of the linkage 16, and
x = displacement of mass 14.

A similar device can serve as an accelerometer for accelerations in the z direction.

While this invention has been particularly shown and described with references to preferred embodiments thereof, it will be understood by those skilled in the art that various changes in form and details may be made therein without department from the spirit and scope of the invention as defined by the appended claims.

For example,, the first mass need not completely enclose the second mass. The first mass may simply wrap around the second mass in any direction. Also, the second mass may be located above or below or next to the first mass, Regarding the beam configuration, the fold-back may comprise more than a single fold.

What is claimed is:

1. A displacement measuring apparatus comprising:
   a first mass of material;
   a second mass of material linked to the first mass of material via parallel means for allowing displacement between the masses in a direction transverse to the beams and providing return force against said displacement, each of said beams comprising arms displaced relative to each other in the direction transverse to the beams and joined end-to-end; and
   a sensor for sensing the displacement of the second mass relative to the first mass.

2. The apparatus of claim 1 wherein the sensor comprises a Hall effect sensor located on a circuit board fixedly attached to the first mass and passing through a fixed gap between magnets fixedly attached to the second mass.

3. The displacement measuring apparatus of claim 1 wherein the first mass serves as a stop which limits displacement of the second mass.

4. A displacement measuring apparatus comprising:
   a first mass of material;
   a second mass of material enclosed by the first mass of material and linked to the first mass of material via parallel beams, said parallel beams allowing displacement between the masses in a direction transverse to the beams and providing return force against said displacement, each of said beams comprising arms displaced relative to each other in the direction transverse to the beams and joined end-to-end; and
   a sensor for sensing the displacement to the second mass relative to the first mass.

5. The apparatus of claim 4 wherein the first mass, the second mass, and the parallel beams are a single unit formed from a single piece of material.

6. The apparatus of claim 4 wherein the sensor comprises a Hall effect sensor located with a magnetic field.

7. The apparatus of claim 6 wherein the magnetic field is formed by two magnets fixedly attached to the second mass, said magnets separated from each other by a fixed gap, and the Hall effect sensor is fixedly attached to the first mass and positioned between the magnets, such that the Hall effect sensor senses the displacement of the masses relative to each other and causes to be generated a signal indicative of the amount of said displacement.

8. The apparatus of claim 7 wherein the Hall effect sensor is located on a circuit board, said circuit board being fixedly attached to the first mass and passing through the gap between the magnets.

9. The apparatus of claim 4 wherein the sensor comprises a Hall effect sensor located on a circuit board fixedly attached to the firs mass and passing through a fixed gap between magnets fixedly attached to the second mass.

10. The displacement measuring apparatus of claim 4 wherein the first mass serves as a stop which limits displacement of the second mass.

11. A method of measuring displacement comprising:
providing a first mass of material and a second mass of material, the two masses being linked by parallel beams to allow displacement between the masses in a direction transverse to the beams and to provide return force against said displacement, each of said beams comprising arms displaced relative to each other in the direction transverse to the beams and joined end-to-end;
displacing the second mass relative to the first mass; and
sensing the displacement of the second mass relative to the first mass.

12. A method of measuring displacement comprising:
providing a first mass of material and a second mass of material, the second mass of material being enclosed within the first mass of material and the two masses being linked by parallel beams, said parallel beams allowing displacement between the masses in a direction transverse to the beams and providing return force against said displacement, each of said beams comprising arms displaced relative to each other in the direction transverse to the beams and joined end-to-end; and
displacing the second mass relative to the first mass; and
sensing the displacement of the second mass relative to the first mass.

13. The method of claim 12 further comprising the step of calculating the force applied to the second mass in the direction of the displacement using the sensed displacement.

14. The method of claim 12 further comprising the step of calculating an angle of inclination using the sensed displacement.

15. The method of claim 12 wherein providing the two masses comprises forming the two masses and the parallel beams from a single piece of material.

16. The method cf claim 12 wherein the sensing is provided by a sensor comprising a Hall effect sensor located within a magnetic field.

17. The method of claim 16 wherein the magnetic field is formed by two magnets fixedly attached to the second mass, said magnets separated from each other by a fixed gap, and the Hall effect sensor is fixedly attached to the first mass and positioned within said gap, such that the Hall effect sensor senses the displacement of the masses relative to each other and causes to be generated a signal indicative of the amount of said displacement.

18. The method of claim 17 wherein the Hall effect sensor is located on a circuit board, said circuit board being fixedly attached to the first mass and passing through the gap between the magnets.

19. A displacement measuring apparatus comprising:
a block;
a mass of material enclosed within the block and linked to the block via parallel beams, the parallel beams allowing displacement between the block and the mass of material in a direction transverse to the beams and providing return force against the displacement, the block, the mass of material and the parallel beams being a single unit formed from a single piece of material; and
a sensor for sensing the displacement of the mass of material relative to the block.

20. The apparatus of claim 19 wherein the sensor comprises a Hall effect sensor location within a magnetic field.

21. The apparatus of claim 20 wherein the magnetic field is formed by two magnets fixedly attached to the mass of material, said magnets being separated from each other by a fixed gap, and the Hall effect sensor is fixedly attache dot the block and positioned between the magnets, such that the Hall effect sensor senses the displacement of the mass of material relative to the block and causes to be generated a signal indicative of the amount of said displacement.

22. The apparatus of claim 21 wherein the Hall effect sensor is located on a circuit board fixedly attached to the block and passing through the gap between the magnets.

23. The apparatus of claim 19 wherein the sensor comprises a Hall effect sensor located on a circuit board fixedly attached to the block and passing through a fixed gap between magnets fixedly attached to the mass of material.

24. The displacement measuring apparatus of claim 19 wherein the block serves as a stop which limits displacement of the mass.

25. A displacement measuring apparatus comprising:
a first mass of material;
a second mass of material enclosed by the first mass and linked to the first mass by parallel beams, said parallel beams allowing displacement between the masses in a direction transverse to the beams and providing return force against the displacement; and
a senor for sensing the displacement of the second mass relative to the first mass, the sensor comprising:
two magnets fixedly attached to the second mass and separated from each other by a fixed gap, and
a Hall effect sensor fixedly attached to the first mass and positioned between the magnets such that the Hall effect sensor senses the displacement of the masses relative to each other and causes to be generated a signal indicative of the amount of the displacement.

26. The apparatus of claim 25 wherein the Hall effect sensor is located on a circuit board fixedly attached to the first mass and passing through the gap between the magnets.

* * * * *